US010191833B2

(12) United States Patent
Chen et al.

(10) Patent No.: US 10,191,833 B2
(45) Date of Patent: Jan. 29, 2019

(54) METHOD TO EFFICIENTLY TRIGGER CONCURRENCY BUGS BASED ON EXPECTED FREQUENCIES OF EXECUTION INTERLEAVINGS

(71) Applicant: VMware, Inc., Palo Alto, CA (US)

(72) Inventors: Bo Chen, Beijing (CN); Hao Chen, Beijing (CN)

(73) Assignee: VMWARE, INC., Palo Alto, CA (US)

( * ) Notice: Subject to any disclaimer, the term of this patent is extended or adjusted under 35 U.S.C. 154(b) by 219 days.

(21) Appl. No.: 14/961,504

(22) Filed: Dec. 7, 2015

(65) Prior Publication Data

US 2017/0161073 A1     Jun. 8, 2017

(51) Int. Cl.
   *G06F 11/36*     (2006.01)
(52) U.S. Cl.
   CPC ................. *G06F 11/3632* (2013.01)
(58) Field of Classification Search
   USPC ....................................................... 717/127
   See application file for complete search history.

(56) References Cited

U.S. PATENT DOCUMENTS

| 5,383,167 | A  | * | 1/1995 | Weil | ..................... | G06F 17/5022 |
|           |    |   |        |      |                       | 703/19       |
| 2011/0131550 | A1 | * | 6/2011 | Burckhardt | ......... | G06F 11/3632 |
|           |    |   |        |      |                       | 717/124      |

OTHER PUBLICATIONS

Park, "CTrigger: Exposing Atomicity Violation Bugs from Their Hiding Places", 2009, ACM ASPLOS.*
Erickson et al., "Effective Data-Race Detection for the Kernel," Microsoft Research, Symposium on Operating Systems Design and Implementation (OSDI '10), Oct. 2010, pp. 1-12.
Carbone, et al., "VProbes: Deep Observability Into the ESXi Hypervisor," VMware Technical Journal, Summer 2014, pp. 1-17.
Ruwase, et al., "Guardrail: A High Fidelity Approach to Protecting Hardware Devices from Buggy Drivers," ASPLOS '14, Mar. 1-5, 2014, 2014 ACM, pp. 1-15.
Renzelmann, et al., "SymDrive: Testing Drivers without Devices," University of Wisconsin-Madison, Proceedings of the 10th USENIX conference on Operating Systems Design and Implementation (OSDI '12), 2012, pp. 1-14.
Kasikci, et al., "Data Races vs. Data Race Bugs: Telling the Difference with Portend," School of Computer Science and Communication Sciences, ASPLOS '12, Mar. 3-7, 2012, pp. 185-198.

(Continued)

*Primary Examiner* — Hossain M Morshed
(74) *Attorney, Agent, or Firm* — Patterson & Sheridan LLP

(57) ABSTRACT

A method includes determining a set of shared memory access instructions and execution frequencies and selecting one or more groups of instructions that access a same memory location. The method also includes finding pairs of instructions from each group, for which another access to the same memory location may occur between execution of the instructions in the pair, and estimating a probability that a data race may occur using a time gap between the instructions and the execution frequencies, and generating a list of instruction tuples that include the pair of instructions. The method includes calculating a score for each instruction in the tuples, the score representing a likelihood of triggering a data race by injecting a delay before an instruction. The method includes selecting instructions having a score indicating a lower than a threshold probability that the instruction will comprise a last access of a data race.

15 Claims, 6 Drawing Sheets

(56) References Cited

OTHER PUBLICATIONS

Fonseca, et al., "SKI: Exposing Kernel Concurrency bugs through Systematic Schedule Exploration," 11th USENIX Symposium on Operating Systems Design and Implementation (OSDI '14), USENIX Association, Oct. 6-8, pp. 414-431.
Serebryany, et al., "ThreadSanitizer—data race detection in practice," WBIA '09, Dec. 12, 2009, ACM, pp. 62-71.
Voung, et al., "Relay: Static Race Detection on Millions of Lines of Code," ESEC/FSE '07, Sep. 3-7, 2007, ACM, pp. 1-14.
Musuvathi, et al., "Finding and Reproducing Heisenbugs in Concurrent Programs," In Proceedings of the 8th USENIX conference on Operating systems design and implementation (OSDI'08). USENIX Association, Berkeley, CA, USA, 267-280.
Park, et al., "CTrigger: Exposing Atomicity Violation Bugs from their Hiding Places," ASPLOS '09, Mar. 7-11, 2009, ACM, pp. 1-12.

\* cited by examiner

METHOD TO EFFICIENTLY TRIGGER CONCURRENCY BUGS BASED ON EXPECTED FREQUENCIES OF EXECUTION INTERLEAVINGS

BACKGROUND

Bugs caused by unintended data races are common, usually serious, and often difficult to detect and reproduce. These bugs can routinely escape long periods of stress testing to cause havoc later. A data race occurs when the same memory location is accessed concurrently, with at least one access being a write. Programmers can prevent harmful data races and achieve a desired atomicity and/or ordering property by using synchronization operations. If a synchronization operation is left out, a wrong one is used, or one is used at a wrong place, a data race bug may be introduced. After a suspected data race bug causes a failure, it is typically difficult to reproduce the failure. This difficulty occurs because after a moderate amount of testing and bug-fixing, the remaining bugs tend to be the least likely to occur in normal execution.

One approach to deal with data races is to locate all shared memory accesses, eliminate those properly protected by synchronization, prune benign races according to some heuristic, and report the remaining as potentially buggy data races. This approach may have a relatively high rate of false positives. The problem of false positives is even more serious in kernel code, which employs a variety of synchronization methods beyond well-defined locking application program interfaces (APIs), such as disabling interrupts, lock instructions, and hardware states.

Another approach, known as systematic schedule exploration, systematically exercises the access interleaving space by controlling the scheduling behavior: the rare, buggy interleaving must be among those systematically explored. However, modifying scheduling behavior for a kernel is much more difficult than for applications.

SUMMARY

One or more embodiments herein provide techniques for triggering data race bugs. One method includes determining a set of shared memory access instructions of a program and determining an execution frequency for each shared memory access instruction. The method includes selecting, from the set of shared memory access instructions, one or more groups of instructions that access a same memory location as other instructions in its group. The method also includes finding pairs of instructions from each group, for which another access to the same memory location may occur between execution of the instructions in the pair causing a data race, and estimating for each pair of instructions a probability that a data race may occur using a time gap between the instructions in the pair and the execution frequencies, and generating a list of instruction tuples, wherein each tuple includes the pair of instructions for which the time gap was determined. The method further includes calculating a score for each instruction in the list of instruction tuples, the score representing a likelihood of triggering a data race by injecting a delay before an instruction in the tuple. The method selects instructions from the set of scored instructions, each selected instruction having a score indicating a lower than a threshold probability that the instruction will comprise a last access of a data race. The method includes injecting a delay before a selected instruction in the tuple.

According to another embodiment, a non-transitory computer-readable storage medium contains a program which, when executed by one or more processors, performs operations for triggering data race bugs as described above.

According to yet another embodiment, a system includes a processor and a memory, wherein the memory includes a program executable in the processor to perform operations for triggering data race bugs as described above.

DETAILED DESCRIPTION

Embodiments described herein provide a method of triggering data race bugs by attempting to trigger the relatively rare interleavings—those less likely to occur in normal stress testing. Two factors affect how likely a potential interleaving may occur: the frequencies that the involved accesses occur, and the interval (or time gap) between the accesses. Infrequent, potentially concurrent accesses and a small natural interval between two "supposedly atomic" sequential accesses result in a very rare access interleaving, which can be a hiding spot for a data race bug. Embodiments described below extract shared memory access instructions, find memory accesses on the same locations as well as their frequencies and gap sizes, and then inject short delays at instructions chosen using information from the earlier steps. When the injected delay triggers a data race bug, the resulting incorrect behavior will likely fail checks already put in place by hardware, kernel, or test cases.

Each of the earlier stages of the process described above serves to provide the next stage with more information about the instructions that may be part of a data race, while filtering out, as early as possible, instructions that would not be part of a data race. This results in a smaller set of instructions to rank and choose from for a delay injection.

One example implementation for the methods and systems described herein is exposing data race bugs in a kernel for a hypervisor that deploys and serves virtual computers. One example kernel is the ESXi kernel from VMware®, Inc. In implementations described below, an instrumentation framework is used to test various products such as an ESXi kernel. One framework utilizes probes that can translate and inject scripts into a running system to monitor function call or instruction level events. The framework may also employ state modification features such as memory and register modification, function skipping, and delay injection. In embodiments described below, the probes may be used to record memory accesses and inject delays.

While techniques described herein utilize runtime analysis, in other embodiments, determining the instructions that access the same memory locations can be done statically by analyzing the source code or compiled binary. For programs written in some languages, static analysis can determine these instructions quite accurately.

Figure 1A:
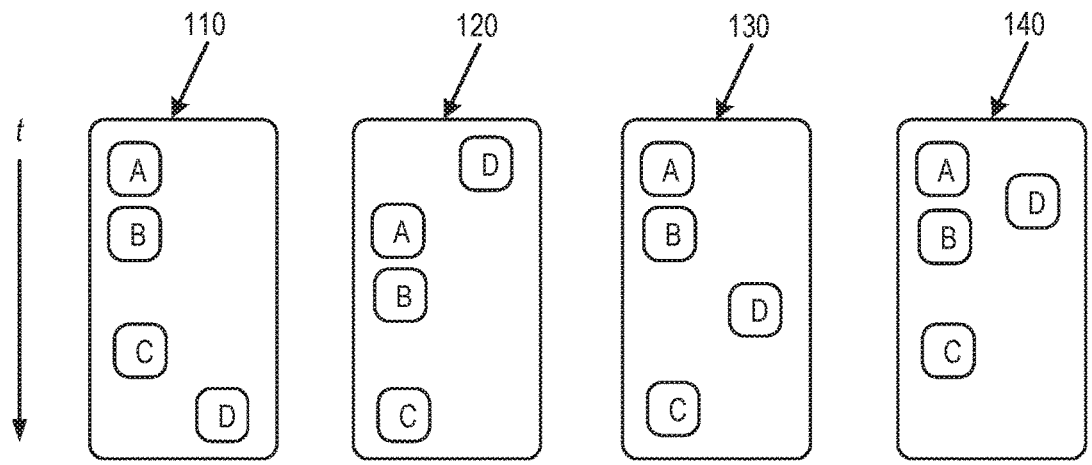
FIG. 1A is a block diagram that illustrates example execution interleavings in accordance with one embodiment.

FIG. 1A illustrates four possible execution interleavings 110, 120, 130, and 140. In FIG. 1A, elements A, B, and C represent instructions that access the same memory address (memory location). Element D represents an instruction that may also access the address from a concurrently executing function. Time t is shown at the left of FIG. 1A, and illustrates that instruction A occurs before instruction B, which occurs before instruction C in each example interleaving.

A small gap appears between instructions A and B, while a larger gap appears between instructions B and C. The physical size of the gap illustrated in FIG. 1A corresponds roughly to the gap in time between the instructions. The size of the gap between the accesses, and the frequency of the accesses, determines the probability of an interleaving. For example, A and B may be separated by just one or two instructions. B and C, on the other hand, may be separated by a larger number of instructions. Interleavings 110 and 120 are the most common of the four interleavings illustrated. In those interleavings, instruction D occurs either sometime before instruction A or sometime after instruction C. Interleaving 130 is less common than interleaving 110 or 120. In interleaving 130, instruction D occurs in the interval between instructions B and C. Interleaving 140 is very uncommon in normal operation due to the small interval between instructions A and B. In accordance with embodiments described herein, a delay can be injected between certain accesses to increase the chance of a specific interleaving. As an example, a delay injected between instructions A and B in interleaving 140 increases the chance of instruction D interleaving between instructions A and B.

Figure 1B:
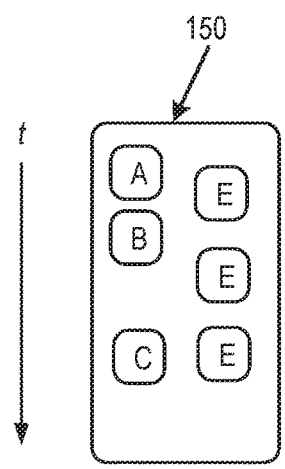
FIG. 1B illustrates another example interleaving according to an embodiment.

FIG. 1B illustrates another execution interleaving 150. In this example, instruction E is illustrated along with instructions A, B, and C. As with FIG. 1A, the interval between instructions A and B is smaller than the interval between instructions B and C. Instruction E is executed more frequently than instruction D illustrated in FIG. 1A, and therefore has a greater probability of encountering the various interleavings with instructions A, B, and C in the same amount of time.

It is difficult to increase the frequency of any access for a given test input, but the gap between instructions can be widened by injecting delays. Embodiments described herein not only inject delays, but also consider the frequency of accesses, and injects delays into the relatively infrequent accesses. This helps to keep the overhead of the delay injection process to an acceptable level. In addition, as noted above, kernel code introduces difficulties not present in other types of code due to the greater variety of concurrency sources and synchronization methods in kernel code.

Figure 2:
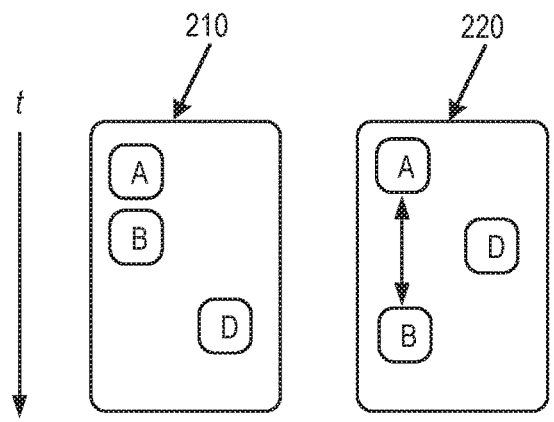
FIG. 2 illustrates another example interleaving according to an embodiment.

FIG. 2 illustrates the concept of a delay injection. Interleaving 210 illustrates example instructions A and B with a small interval between them. As noted above, this small interval means that it is rare for an instruction such as instruction D to interleave between instructions A and B. Therefore, as illustrated in interleaving 220, a delay is injected between instructions A and B. This delay increases the chances of the interleaving ADB occurring. Embodiments of the present disclosure consider infrequent accesses and the intervals between those accesses to trigger data races with delay injection. Embodiments of the present disclosure are also particularly useful for triggering data race bugs in operating system (OS) kernels.

Figure 3A:
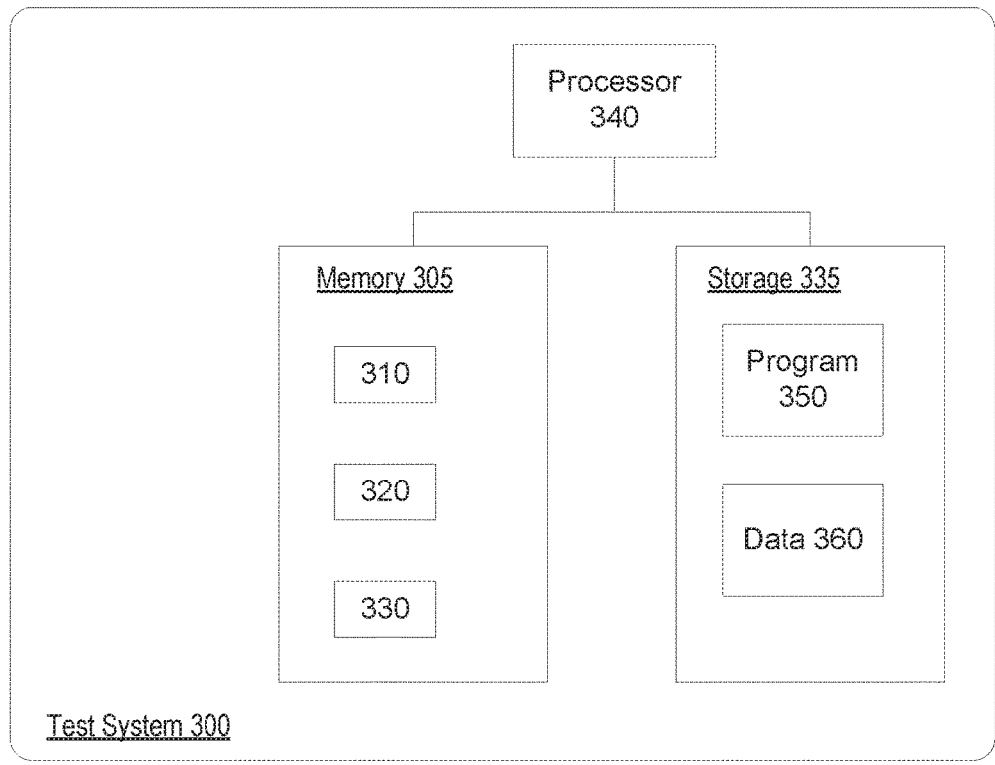
FIG. 3A illustrates an example test system in accordance with embodiments of the present disclosure.

FIG. 3A illustrates an example test system 300 in accordance with embodiments of the present disclosure. Test system 300 can be used to implement the embodiments described herein. Test system 300 comprises a processor 340 and memory 305. Test system 300 further comprises storage 335. Processor 340 retrieves and executes programming instructions stored in the memory 305 and/or storage 335. Similarly, processor 340 stores and retrieves data 360 residing in the storage 335. Processor 340 may also retrieve a program 350 from storage 335. Program 350 comprises the kernel or application under test.

Processor 340 is included to be representative of a single CPU, multiple CPUs, a single CPU having multiple processing cores, and the like. Memory 305 and storage 335 comprise any suitable types of memory or storage. Illustratively, memory 305 includes programs for a binary analysis stage 310, a runtime analysis stage 320, and a bug triggering stage 330. These stages are discussed in further detail below.

Figure 3B:
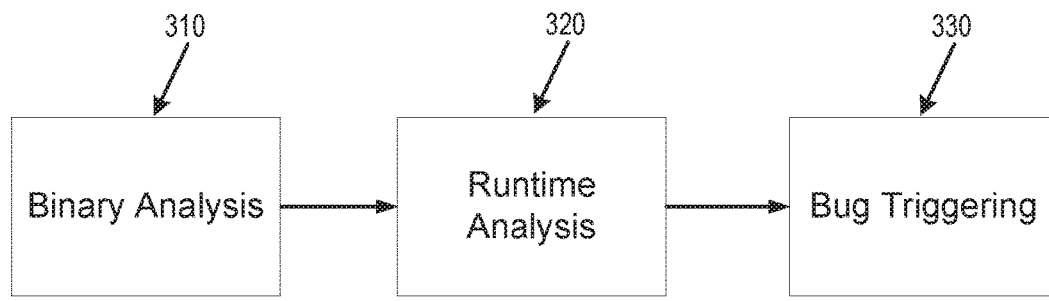
FIG. 3B illustrates a conceptual diagram of the stages (or modules) of the bug triggering process according to an embodiment.

FIG. 3B illustrates a more detailed conceptual diagram of the stages (or modules) of the bug triggering process described herein. The first stage is the binary analysis stage 310. The binary analysis stage 310 extracts shared memory instructions. More specifically, the binary analysis stage 310 examines each memory access instruction in the specified kernel module binary (or compiled program) and filters out any that could not possibly be part of a data race.

The runtime analysis stage 320 finds memory accesses on the same locations as well as the frequencies and gap sizes of those memory accesses. The runtime analysis stage 320 performs this action by running a test workload for the specified driver/kernel module being tested.

The bug triggering stage 330 injects short delays at instructions chosen using information from the earlier stages. When the injected delay triggers a data race bug hiding in the rare interleavings, the resulting incorrect behavior will likely fail checks already put in place by hardware (e.g., CPU exceptions), kernel (e.g., assertions, errors, and warnings), or test cases (e.g., test failure).

Each of the earlier stages illustrated in FIG. 3B provides the next stage with more information about the instructions that may be part of a data race. The earlier stages also filter out possible instructions that would not be part of a data race. The goal of the earlier stages is to produce a relatively small set of instructions to rank and choose from for a delay injection. The filtering can be either conservative or aggressive. Conservative filtering results in only filtering out instructions that are guaranteed to not be part of a data race. Conservative filtering in other race detectors can lead to a high number of false positives remaining in the set of instructions. However, for the race triggering tool described in these embodiments, conservative filtering merely adds more candidates for delay injection without affecting the correctness of the candidates.

Figure 4:
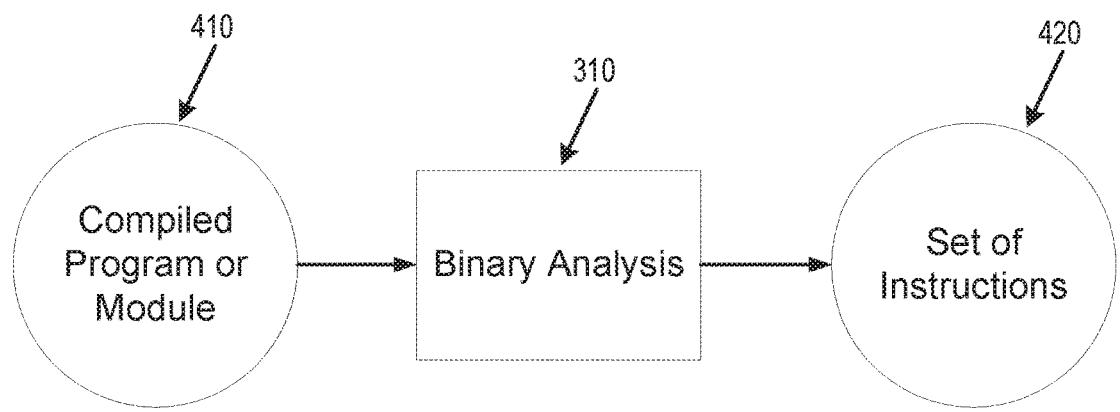
FIG. 4 illustrates a binary analysis stage according to an embodiment.

FIG. 4 illustrates the binary analysis stage 310. Specifically, the inputs and outputs of the binary analysis stage 310 are illustrated. At a high level, the binary analysis stage 310 determines the set of shared memory access instructions of a program or module. As one example, the binary analysis stage 310 reviews each memory access instruction in the specified kernel module binary and filters out any instructions that cannot be part of a data race. The binary analysis stage 310 then outputs the set of instructions that access shared memory. Key information for each instruction is recorded, including its offset in the binary, the size of the access (for example, 1, 2, 4, or 8 bytes), whether the instruction is a read or a write, and the symbolic access of the memory the instruction accesses. Instructions that access read-only segments or the stack can be excluded because they cannot be part of a data race.

When the binary analysis stage 310 operates on a kernel module, other filtering can be performed in certain embodiments. With knowledge of the kernel locking facilities, filtering can be added for accesses protected by locks and other synchronization methods. Because these locks can protect accesses against data race bugs, those accesses can be removed during the binary analysis stage 310, as they cannot be a part of a data race. In addition, benign races within synchronization operations may be removed. Thus, the additional filtering described herein can be used in certain embodiments to reduce the number of candidates for the next stages.

Figure 5:
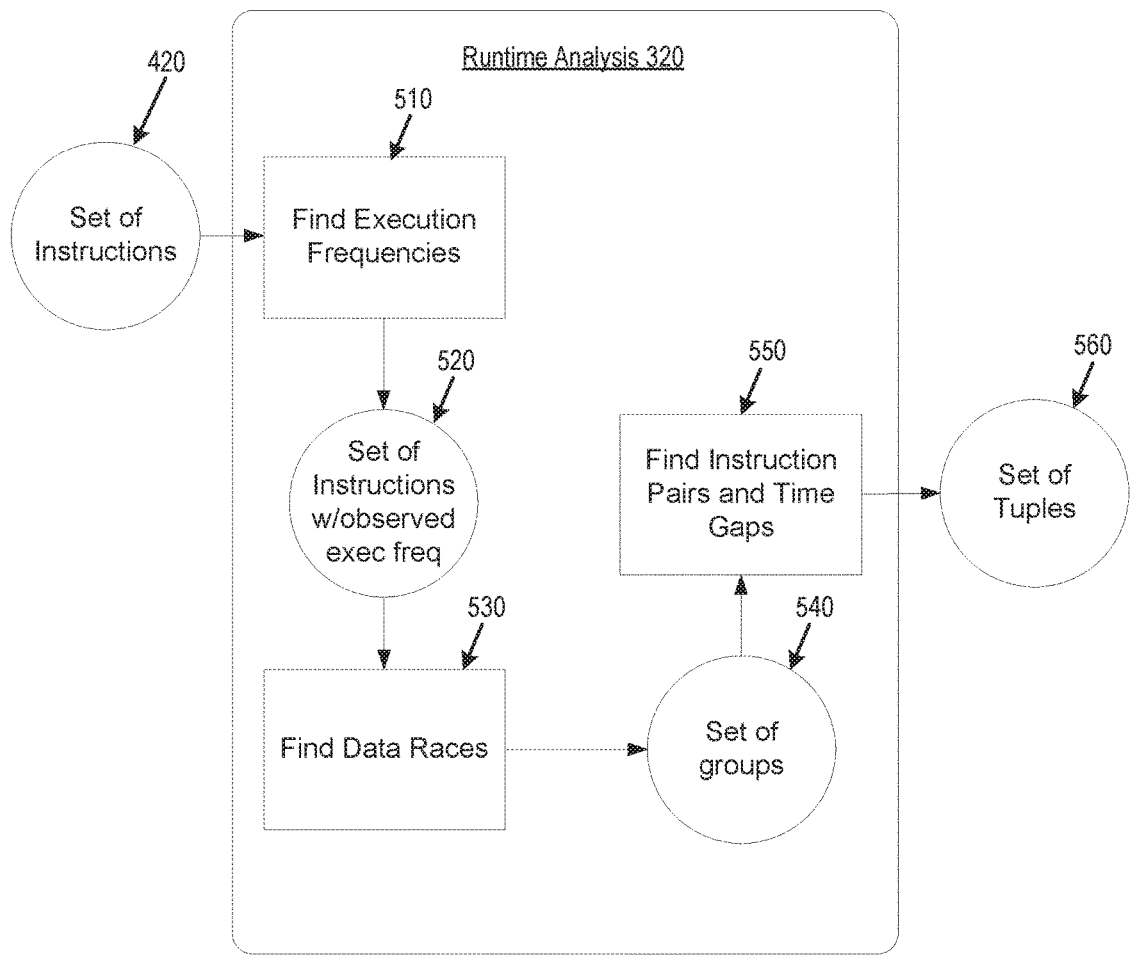
FIG. 5 illustrates a runtime analysis stage according to an embodiment.

FIG. 5 illustrates the runtime analysis stage 320. Specifically, the inputs and outputs of the runtime analysis stage 320 are illustrated. At a high level, the runtime analysis stage 320 analyzes the set of shared memory access instructions 420, which were output by the binary analysis stage 310, and then outputs the shared memory access instructions 420 with their observed execution frequencies and gap sizes. This process is performed in multiple steps within the runtime analysis stage 320. In addition, this stage requires running the program or module under test. The input (e.g., a test case or workload) is ideally the same across the run-time stages.

For the first step of the runtime analysis stage 320, the set of instructions 420 is input to the Find Execution Frequencies function 510. The Find Execution Frequencies function 510 determines the observed execution frequency of each instruction in the set of instructions 420. The function 510 can also be referred to as "hit-counting." Any suitable method of determining the execution frequency may be used. In one embodiment, a "function offset probe" may be associated with each instruction. The probe fires just before the instruction executes. Each instruction is associated with a counter that is incremented by the probe. At the end of the counting period, the value of each counter is output. Thus, a count of executions for each instruction is generated. Instructions that result in a frequency of zero (i.e., the instruction is never executed) are removed from the set. If the maximum number of probes is limited for any reason, the set of instructions 420 can be partitioned into groups and then run one group at a time. The output is then combined when all groups have been run.

In some embodiments, the hit counting stage (Find Execution Frequencies function 510) may be combined with the next stage. However, a separate hit counting stage has a few advantages. First, hit counting may be able to filter out a large percentage of the memory access instructions. This is because a single test case often exercises only a small percentage of all code paths. As the shared access sampling stage (discussed below) finds instructions accessing the same memory location, having that stage choose instructions from a smaller pool of candidates gives any two instructions a much better chance to be active in the same time. Second, while the hit counting stage only generates aggregated frequency data, the shared access sampling stage generates individual memory accesses. It can be impractical to generate all of the memory accesses, due to the large number of them. The instruction frequency data from the hit counting stage is useful in deciding the sampling rate for each instruction, as one goal of the embodiments described herein is recording the few accesses by the rarely executed instructions.

In another embodiment, the lowest and highest address accessed by each instruction is collected. The "stride" (common distance) between the accessed addresses is also collected. This generates three additional integers per instruction (lowest address, highest address, stride). These integers allow this stage to find instructions that likely access the same addresses, without having to record each individual access. The use of highest and lowest accessed address is clear: if any two instructions ever access the same address, the range of addresses they access must overlap. The use of "stride" comes from the observation that usually each instruction only accesses a specific field of a specific type of object. For example, an instruction that reads the "Total Length" of IP headers is unlikely to read its "Source Address" field, or another type of object. The instruction would not access the same memory location as an instruction that reads the "Source Address" field. In addition, objects of the same type are typically separated by a fixed, minimum distance ("stride") or a multiple of it, and consequently, the same fields in objects of the same type are also separated by multiples of the stride. Using the stride of addresses that an instruction is found to observe strictly, and an address it accessed (such as the lowest accessed address), we can know which discrete addresses this instruction might access, and whether another instruction may access the same addresses. This information can be fed to the next stage to determine which instructions should be instrumented in the same time. In another embodiment, we can discard as candidates those instructions that do not share memory with any other instruction, which may constitute a quarter to a third of instructions at this stage in some implementations.

The "range and stride" method reduces the addresses an instruction may access to discrete points along the line segment Min+n*Stride, where n is a positive integer and Min+n*Stride<=Max. The method updates the integers Min, Max, and Stride as accesses are observed so that those integers reflect all accesses observed. If two instructions are determined to be non-overlapping using the "range and stride" method, then it is certain that they never access the same address. The inverse, however, is not true. If two instructions are determined to be overlapping using the "range and stride" method, they may have accessed the same address, but it is not certain that they have. Thus, after the "range and stride" method finds potentially overlapping instructions, another run can be performed that records all accesses of the less frequent instructions, to remove the "false overlaps" related to these instructions. For other, more frequent instructions, the potential overlaps found by the range and stride method are used to proximate actual overlaps. While this may increase the run time for later stages of the process, it will guarantee no misses.

In yet another embodiment, sampling may be used to record a random sample of the more frequent accesses, to determine which addresses an instruction accesses. This method can be useful if it is impractical to record every single memory access of a program. The sampling rate could be determined by the instruction frequency. However, random sampling can sometimes lead to an incorrect conclusion that two instructions do not access the same address, if the only shared access happens to be discarded due to sampling. The range and stride method described above generally provides better results.

As illustrated in FIG. 5, the output of the Find Execution Frequencies (or hit counting) stage 510 is the set of instructions with observed frequencies 520. The set of instructions 520 is input into the next stage, Find Data Races 530. In stage 530, the process finds the sets of instructions that may form a data race on the same memory location. At a high level, the output of stage 530 is a set of groups 540. Using run-time instrumentation of the program on the shared memory access instructions, the memory locations accessed by each of the shared memory access instructions can be obtained. For each memory write instruction among the shared memory access instructions, the method finds all instructions (read or write) that overlap with the memory write instruction. The memory write instruction, and the instructions that overlap with it, are placed into a set. If a set contains only the memory write instruction (i.e., no other instruction overlaps with it), that set can be removed, as it will not result in a data race. The remaining sets are returned as a result of this stage.

As discussed above, multiple sampling runs may be used to find data races in some embodiments by recording random samples. That is, the set of instructions can be partitioned into groups and then run one group at a time. In one embodiment, at each sampling run, a probe is instrumented at each memory access instruction. The probe records an access, which outputs the instruction ID, the access time (in time stamp counter), PCPU (physical or logical CPU), and the address accessed. The probe can determine which accesses to record by using logic. One example determination logic is: Output if R mod $F_i \leq F_m$, where R is a large random or pseudo-random number, $F_i$ is the execution frequency of instruction i measured from the last stage, and $F_m$ (maximum frequency) is a constant shared between all instructions. Any suitable values may be used for the variables in the logic. For R, the current time stamp counter may be used, or any other suitable random or pseudo-random number. In one embodiment, the value of $F_m$ was chosen to be 40 as a result of experimentation. Of course, other values may be used in other embodiments. The output logic limits the maximum number of output from each instruction to approximately $F_m$ per second, which is useful in certain implementations so that an output buffer in the probe does not overflow. Also, the output logic favors rarely executed instructions by giving them a higher sampled chance that is roughly inversely proportional to their frequencies.

After each sampling run, the output of the probes can be analyzed to find groups of instructions that accessed the same addresses. The output of the probes is the set of groups 540 illustrated in FIG. 5. These sets of groups 540 are input to stage 550. Groups of instructions, and time gaps, are determined in stage 550 as illustrated in FIG. 5. In one embodiment, the method finds pairs of instructions that access the same memory location from the same thread/CPU (these are called the "current" and "previous" accesses) and also finds instructions that may access the same memory location from another thread/CPU (called the "remote" accesses). In addition, the method finds the average or minimal per-second time gap between each current and previous access pair at stage 550. In some embodiments, the average time gap is the average fraction of time spent between the previous and current access during a period of measurement (as described with respect to Table 1 below). This measurement of the average time gap is a unit-less quantity. In other embodiments, the average (or minimal) time gap is a unit of time, measured in seconds, that describes an average or minimal time gap between two accesses. This time gap is multiplied by the frequency of previous-to-current accesses, which results in a unit-less quantity.

For stage 550, the output is a set of instruction tuples 560 each containing the "current" instruction currentInstr, the "previous" instruction previousInstr, a set of possible "remote" access instructions setRemoteInstr, and the average or minimal per-second time gap between the current and previous instructions timeGap.
InstructionTuple=(currentInstr,previousInstr,setRemoteInstr,timeGap)
The current, previous, and remote instructions are from the same shared memory access set 520 described above. The per-second time gap is the total amount of time a thread/CPU spends between the previous instruction and the current instruction. As an example, assuming instructions A and B belong to the same shared memory access set 520, and on the same thread/CPU, the execution of A and B during a 10-second period is as follows in Table 1:

TABLE 1

| |
|---|
| <2 s> |
| A |
| <0.1 s> |
| B |
| <1.9 s> |
| A |
| <1 s> |
| A |
| <1 s> |
| A |
| <0.1 s> |
| B |
| <2 s> |
| A |
| <1 s> |
| A |
| <0.9 s> |

The total time spent between instructions A and B (that is, A being the previous instruction and B being the current instruction) is 0.2 s. A is immediately followed by B twice in the example illustrated in Table 1, and each of those times the gap between A and B is 0.1 second. Therefore, the total time spent between instructions A and B is 0.1 s×2, or 0.2 s. Because a 10-second period of execution is illustrated in Table 1, the average per-second time gap (i.e., the average fraction of time spent between the previous and current access) is 0.2 s/10 s=0.02, or 2%.

On the other hand, the tuple with B as the previous instruction and A as the current instruction occurs twice in Table 1. The total time spent between instructions B and A is 1.9 s+2 s, or 3.9 s. Because a 10-second period of execution is illustrated in Table 1, the average per-second time gap measured this way is 3.9 s/10 s=0.39, or 39%.

If all gaps between chosen instructions can be accurately measured, the average gap size can be calculated and used, as in the example Table 1 above. If for some reason the total gap cannot be accurately measured, such as significant and unpredictable overhead from the instrumentation tools used, the minimal per-second time gap may be used instead. The minimal per-second time gap is the minimal observed gap multiplied by the frequency of the two instructions executing sequentially. If for some reason the frequency of the two instructions executing sequentially cannot be accurately measured, the smaller of the frequencies of A and B may be used instead. For the example illustrated in Table 1 above, the minimal time gap of A to B is 0.1 s. The minimal time gap of B to A is 1.9 s. The frequency of A-B and B-A are both 0.2 per second. The frequency of A is 0.6 per second, and the frequency of B is 0.2 per second. The frequency of B is the smaller of the two, and therefore that frequency may be used to approximate the frequency of either A-B or B-A. Thus, the minimal per-second time gap between A and B is 0.1 s*0.2/s, or 0.02. The minimal per-second time gap between B and A is 1.9 s*0.2/s, or 0.38. As discussed above, different measurements may be used to determine an average time gap. The time gap, however it is measured, can then be used to calculate a score.

Figure 6:
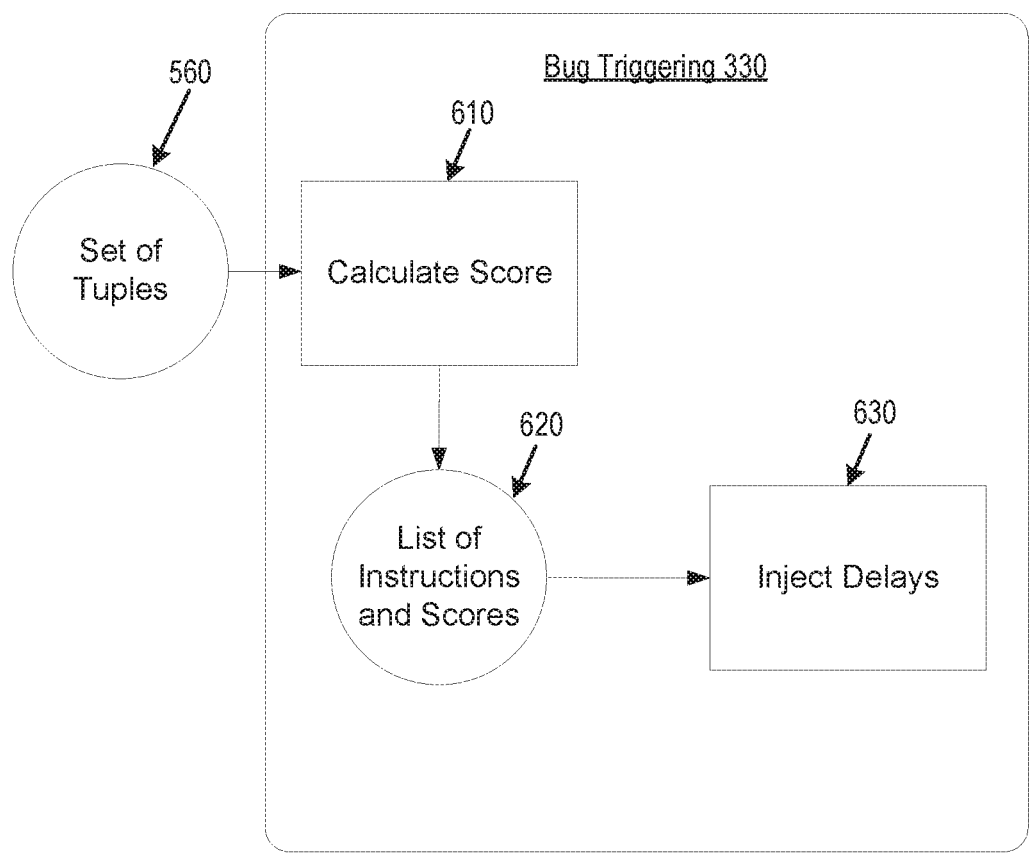
FIG. 6 illustrates a bug triggering stage according to an embodiment.

FIG. 6 illustrates the Bug Triggering stage 330. The set of tuples 560 is input to the Bug Triggering Stage 330. These tuples 560 are input to the Calculate Score stage 610. After a score is calculated, the output of stage 610 is a set of instructions 620, each of which has a score. The score may be calculated in stage 610 in a variety of ways. One example embodiment is described herein. First, for each remote access instruction for a tuple in the set of instruction tuples 560, a score is calculated representing how likely the executing interleaving previous→remote→current may occur. If the per-second time gap between the previous and current accesses is G, and the frequency of the remote access is F, then the probability of the aforementioned interleaving occurring within a second is $1-(1-G)^F$. This probability can be used as the score.

Another example embodiment to calculate the score is to use the minimal interval between a current and previous access I, the frequency of the instruction $F_c$, and the frequency of the least frequent instruction that also accessed the same address $F_l$. The score could then be calculated as $I(F_c+F_l)$, and a low score indicates a good instruction before which to inject a delay.

For each tuple, a score is selected, which may simply be the minimal (best) of the scores for its remote access instructions. In other words, the probability of the least probable previous→remote→current interleaving is used as the score for the tuple with the "previous" and "current" access.

The next stage illustrated in FIG. 6 is the Inject Delays stage 630. In this stage, short delays are injected before instructions that have good scores to trigger rare execution interleavings, including potentially buggy interleavings. The input to stage 630 is, at minimum, the list of instruction tuples and scores 620 with scores better than a certain predetermined cutoff score. Intermediate output from FIG. 5 or 6 may also be used to optimize the process by adjusting the delay length for each instruction, and/or by adjusting how long delay injection lasts for each instruction. In this example, there is no required output for the Inject Delays stage 630. In some implementations, the interleavings that actually occurred during the delay injection stage 630 are generated. The effect of stage 630 is that the running program or module will much more easily encounter rare execution interleavings, including potentially buggy interleavings, and expose data race bugs.

Figure 7:
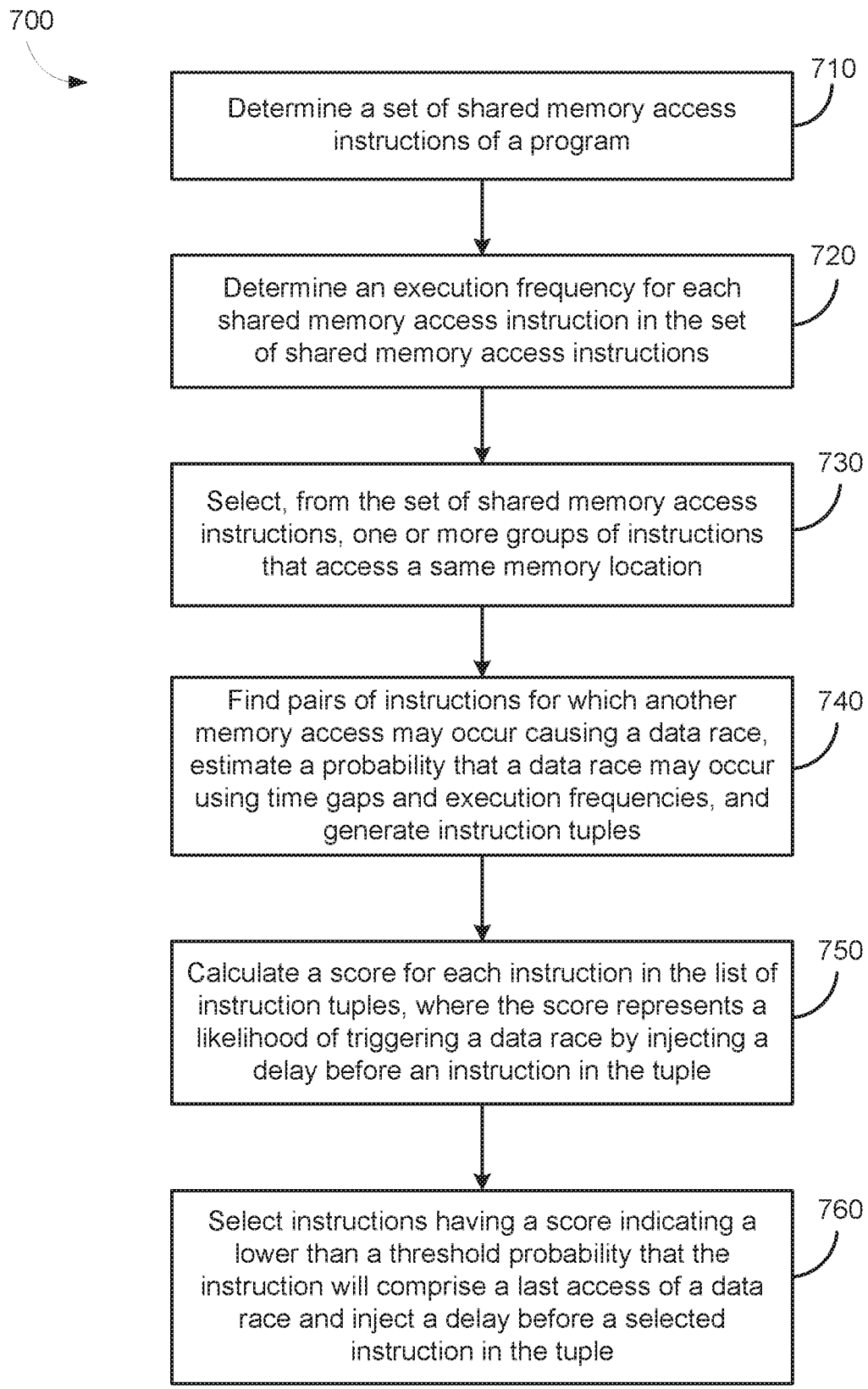
FIG. 7 is a flow diagram that illustrates a method of triggering data race bugs.

FIG. 7 is a flow diagram that illustrates a method 700 of triggering concurrency bugs. Although the method steps are described in conjunction with the systems of FIGS. 1-6, persons skilled in the art will understand that any system configured to perform the method steps, in any order, falls within the scope of the present invention. In various embodiments, the hardware and/or software elements described above in FIGS. 1-6 can be configured to perform the method steps of FIG. 7.

As shown, a method 700 begins at step 710 where a binary analysis module determines a set of shared memory access instructions of a program. The binary analysis module determined the shared memory access instructions by receiving as input a compiled program or module, and generating a set of instructions that may access shared memory. As one example, the binary analysis module 310 reviews each memory access instruction in a specified kernel module binary and filters out any instructions that cannot be part of a data race. The binary analysis module 310 then generates the set of instructions that may access shared memory. Key information for each instruction is recorded, including its offset in the binary, the size of the access (for example, 1, 2, 4, or 8 bytes), whether the instruction is a read or a write, and the symbolic access of the memory the instruction accesses.

The method proceeds to step 720, where a runtime analysis module 320 receives the set of instructions output from step 710 and determines an execution frequency for each shared memory access instruction in the set of shared memory access instructions. Any suitable method of determining the execution frequency may be used. In one embodiment, a function offset probe may be associated with each instruction. The probe fires just before the instruction executes. Each instruction is associated with a counter that is incremented by the probe. At the end of the counting period, the value of each counter is output. Thus, a count of executions for each instruction is generated.

The method proceeds to step 730, where the runtime analysis module 320 selects, from the set of shared memory access instructions, one or more groups of instructions that access a same memory location. Each instruction in a group accesses a same memory location as other instructions in the same group.

The method proceeds to step 740, where the runtime analysis module 320 finds pairs of instructions from each group, for which another access to the same memory location may occur between execution of the instructions in the pair causing a data race, and estimates for each pair of instructions a probability that a data race may occur using a time gap between the instructions in the pair and the execution frequencies.

In one embodiment, the runtime analysis module 320 finds pairs of instructions that access the same memory location from the same thread/CPU (these are called the "current" and "previous" accesses) and also finds instructions that may access the same memory location from another thread/CPU (called the "remote" accesses). In addition, the runtime analysis module 320 finds the average or minimal per-second time gap between each current and previous access pair.

For step 740, the output is a list of instruction tuples, where each instruction tuple contains the "current" instruction, the "previous" instruction," a set of possible "remote" access instructions, and the average or minimal per-second time gap between the current and previous instructions.

The method proceeds to step 750, where the bug triggering module 330 calculates a score for each instruction in the list of instruction tuples, where the score represents a likelihood of triggering a data race by injecting a delay before an instruction in the tuple. Calculating the score is described above with respect to FIG. 6. A score can be calculated representing how likely the executing interleaving previous→remote→current may occur.

The method proceeds to step 760, where the bug triggering module 330 selects instructions from the set of scored instructions, each selected instruction having a score indicating a lower than a threshold probability that the instruction will comprise a last access of a data race. The bug triggering module 330 then injects a delay before an instruction in the tuple. Short delays are injected before instructions that have good scores (i.e., low probabilities) to trigger rare execution interleavings, including potentially buggy interleavings. After this step, the running program or module will much more easily encounter rare execution interleavings, including potentially buggy interleavings, and expose data race bugs.

Embodiments described herein provide a method of triggering concurrency bugs. These embodiments trigger bugs in rare access interleavings that often are not triggered during normal testing. The solutions described herein also produce no false positives when triggering bugs. Embodiments described herein are also useful for debugging kernel code.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for triggering concurrency bugs, comprising:
   determining a set of shared memory access instructions of a program using binary analysis of the program;
   determining, during runtime, an execution frequency, memory access time, and location of memory accessed for each shared memory access instruction in the set of shared memory access instructions;
   selecting, from the set of shared memory access instructions, one or more groups of instructions, wherein each instruction in the group accesses a same memory location as other instructions in its group;
   finding pairs of instructions from each group that access the same memory location from a first thread and finding instructions that access the same memory location from another thread, and estimating for each pair of instructions a probability that a data race may occur using an average time gap between the instructions in the pair and the execution frequencies;
   generating a list of instruction tuples, wherein each tuple includes the pair of instructions from the first thread, the instructions that access the same memory location from another thread, and the average time gap;
   calculating a score for each instruction pair in the list using the instruction tuples, wherein calculating the score comprises calculating a score based at least in part on the average time gap and an exponential of a frequency of the instruction that accesses the same memory location from another thread, a n d wherein the score represents a likelihood of triggering a data race by injecting a delay before an instruction in the tuple;
   selecting instructions from scored instructions, each selected instruction having a score indicating a lower than a threshold score that the instruction will comprise a last access of a data race;
   injecting a delay before a selected instruction in the tuple; and
   executing the program with the injected delay to trigger a data race in the instructions to identify a low probability bug.

2. The method of claim 1, wherein injecting the delay further comprises:
   injecting the delay to increase the average time gap between accesses of the shared memory location by the pair of instructions, wherein injecting the delay increases the probability that a third instruction accesses the same memory location between accesses of the same memory location by the pair of instructions.

3. The method of claim 1, wherein an average time gap is determined by determining an average time spent between accesses of the same memory location over a period of measurement.

4. The method of claim 1, wherein an average time gap is determined by determining an average or minimal time gap of multiple accesses of the same memory location by the pair of instructions.

5. The method of claim 1, wherein selecting one or more groups of shared memory access instructions comprises observing a range of memory locations accessed by each instruction in a first set of shared memory access instructions and determining if two or more ranges overlap.

6. A non-transitory computer-readable storage medium containing a program which, when executed by one or more processors, performs operations for scheduling computing resources, the operations comprising:
   determining a set of shared memory access instructions of a program using binary analysis of the program;
   determining, during runtime, an execution frequency, memory access time, and location of memory accessed for each shared memory access instruction in the set of shared memory access instructions;
   selecting, from the set of shared memory access instructions, one or more groups of instructions, wherein each instruction in the group accesses a same memory location as other instructions in its group;
   finding pairs of instructions from each group that access the same memory location from a first thread and finding instructions that access the same memory location from another thread, and estimating for each pair of instructions a probability that a data race may occur using an average time gap between the instructions in the pair and the execution frequencies;
   generating a list of instruction tuples, wherein each tuple includes the pair of instructions from the first thread, the instructions that access the same memory location from another thread, and the average time gap;
   calculating a score for each instruction pair in the list using the instruction tuples, wherein calculating the score comprises calculating a score based at least in part on the average time gap and an exponential of a frequency of the instruction that accesses the same memory location from another thread, and wherein the score represents a likelihood of triggering a data race by injecting a delay before an instruction in the tuple;
   selecting instructions from scored instructions, each selected instruction having a score indicating a lower than a threshold score that the instruction will comprise a last access of a data race; and
   injecting a delay before a selected instruction in the tuple; and
   executing the program with the injected delay to trigger a data race in the instructions to identify a low probability bug.

7. The non-transitory computer-readable storage medium of claim 6, wherein injecting the delay further comprises:
   injecting the delay to increase the average time gap between accesses of the shared memory location by the pair of instructions, wherein injecting the delay increases the probability that a third instruction accesses the same memory location between accesses of the same memory location by the pair of instructions.

8. The non-transitory computer-readable storage medium of claim 6, wherein an average time gap is determined by determining an average time spent between accesses of the same memory location over a period of measurement.

9. The non-transitory computer-readable storage medium of claim 6, wherein an average time gap is determined by determining an average or minimal time gap of multiple accesses of the same memory location by the pair of instructions.

10. The non-transitory computer-readable storage medium of claim 6, wherein selecting one or more groups of shared memory access instructions comprises observing a range of memory locations accessed by each instruction in a first set of shared memory access instructions and determining if two or more ranges overlap.

11. A system, comprising:

a processor; and a memory, wherein the memory includes a program executable in the processor to perform operations for scheduling computing resources, the operations comprising:

determining a set of shared memory access instructions of a program using binary analysis of the program;

determining, during runtime, an execution frequency, memory access time, and location of memory accessed for each shared memory access instruction in the set of shared memory access instructions;

selecting, from the set of shared memory access instructions, one or more groups of instructions, wherein each instruction in the group accesses a same memory location as other instructions in its group;

finding pairs of instructions from each group that access the same memory location from a first thread and finding instructions that access the same memory location from another thread, and estimating for each pair of instructions a probability that a data race may occur using an average time gap between the instructions in the pair and the execution frequencies;

generating a list of instruction tuples, wherein each tuple includes the pair of instructions from the first thread, the instructions that access the same memory location from another thread, and the average time gap;

calculating a score for each instruction pair in the list using the instruction tuples, wherein calculating the score comprises calculating a score based at least in part on the average time gap and an exponential of a frequency of the instruction that accesses the same memory location from another thread, and wherein the score represents a likelihood of triggering a data race by injecting a delay before an instruction in the tuple;

selecting instructions from scored instructions, each selected instruction having a score indicating a lower than a threshold score that the instruction will comprise a last access of a data race; and injecting a delay before a selected instruction in the tuple; and executing the program with the injected delay to trigger a data race in the instructions to identify a low probability bug.

12. The system of claim 11, wherein injecting the delay further comprises: injecting the delay to increase the average time gap between accesses of the shared memory location by the pair of instructions, wherein injecting the delay increases the probability that a third instruction accesses the same memory location between accesses of the same memory location by the pair of instructions.

13. The system of claim 11, wherein an average time gap is determined by determining an average time spent between accesses of the same memory location over a period of measurement.

14. The system of claim 11, wherein an average time gap is determined by determining an average or minimal time gap of multiple accesses of the same memory location by the pair of instructions.

15. The system of claim 11, wherein selecting one or more groups of shared memory access instructions comprises observing a range of memory locations accessed by each instruction in a first set of shared memory access instructions and determining if two or more ranges overlap.

* * * * *